US010646921B2

(12) United States Patent
Yang et al.

(10) Patent No.: US 10,646,921 B2
(45) Date of Patent: May 12, 2020

(54) EXCAVATED NANOFRAMES WITH THREE-DIMENSIONAL ELECTROCATALYTIC SURFACES

(71) Applicants: Peidong Yang, Kensington, CA (US); Nigel H. Becknell, Albany, CA (US); Yoonkook Son, Emeryville, CA (US)

(72) Inventors: Peidong Yang, Kensington, CA (US); Nigel H. Becknell, Albany, CA (US); Yoonkook Son, Emeryville, CA (US)

(73) Assignee: The Regents of the University of California, Oakland, CA (US)

( * ) Notice: Subject to any disclaimer, the term of this patent is extended or adjusted under 35 U.S.C. 154(b) by 4 days.

(21) Appl. No.: 15/935,331

(22) Filed: Mar. 26, 2018

(65) Prior Publication Data
US 2018/0281060 A1    Oct. 4, 2018

Related U.S. Application Data

(60) Provisional application No. 62/479,580, filed on Mar. 31, 2017.

(51) Int. Cl.
*B22F 1/00* (2006.01)
*B01J 35/00* (2006.01)
*B01J 35/02* (2006.01)
*B22F 7/00* (2006.01)
*C25B 11/04* (2006.01)
(Continued)

(52) U.S. Cl.
CPC ............ *B22F 1/0018* (2013.01); *B01J 23/892* (2013.01); *B01J 35/002* (2013.01); *B01J 35/0033* (2013.01); *B01J 35/026* (2013.01); *B22F 1/0085* (2013.01); *B22F 1/0088* (2013.01); *B22F 7/008* (2013.01); *C25B 11/0494* (2013.01); *B22F 2001/0029* (2013.01); *B22F 2001/0037* (2013.01); *B22F 2301/10* (2013.01); *B22F 2301/15* (2013.01); *B22F 2301/25* (2013.01); *B22F 2301/35* (2013.01); *B22F 2303/40* (2013.01); *B22F 2998/10* (2013.01); *B82B 3/008* (2013.01); *B82B 3/0038* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| 2012/0175585 A1* | 7/2012 | Banin | B22F 1/0018 257/12 |
| 2013/0184146 A1* | 7/2013 | Sun | B01J 35/0013 502/5 |

(Continued)

OTHER PUBLICATIONS

Chen, C., et al. "Highly Crystalline Multimetallic Nanoframes with Three-Dimensional Electrocatalytic Surfaces" Science 2014, 343, 1339.

(Continued)

*Primary Examiner* — Katie L. Hammer

(57) ABSTRACT

Described herein are metallic excavated nanoframes and methods for producing metallic excavated nanoframes. A method may include providing a solution including a plurality of excavated nanoparticles dispersed in a solvent, and exposing the solution to chemical corrosion to convert the plurality of excavated nanoparticles into a plurality of excavated nanoframes.

20 Claims, 11 Drawing Sheets

(51) Int. Cl.
    B01J 23/89    (2006.01)
    B82Y 40/00    (2011.01)
    B82B 3/00     (2006.01)
    B82Y 30/00    (2011.01)

(56) References Cited

U.S. PATENT DOCUMENTS

2015/0236355 A1     8/2015   Yang
2018/0214943 A1*    8/2018   Xia .................. B22F 1/0018

OTHER PUBLICATIONS

Stamenkovic, V. R., et al. "Improved Oxygen Reduction Activity on Pt3Ni(111) via Increased Surface Site Availability" Science 2007, 315, 493.

Wang, C., et al., "Design and Synthesis of Bimetallic Electrocatalyst with Multilayered Pt-Skin Surfaces" J. Am. Chem. Soc. 2011, 133, 14396.

Becknell, N., et al. "Atomic Structure of Pt3Ni Nanoframe Electrocatalysts by in Situ X-ray Absorption Spectroscopy" J. Am. Chem. Soc. 2015, 137, 15817.

Van Der Vliet, D. F., et al. "Unique Electrochemical Adsorption Properties of Pt-Skin Surfaces" Angew. Chem., Int. Ed. 2012, 51, 3139.

Niu, Z., et al. "Anisotropic phase segregation and migration of Pt in nanocrystals en route to nanoframe catalysts" Nat. Mater. 2016, 15, 1188.

Cui, C. H., et al. "Compositional segregation in shaped Pt alloy nanoparticles and their structural behaviour during electrocatalysis" Nat. Mater. 2013, 12, 765.

Gan, L., et al. "Element-specific anisotropic growth of shaped platinum alloy nanocrystals" Science 2014, 346, 1502.

Becknell, N., et al. "Synthesis of PtCo3 polyhedral nanoparticles and evolution to Pt3Co nanoframes" Surf. Sci. 2016, 648, 328.

N. Becknell, et al., "Control of Architecture in Rhombic Dodecahedral Pt—Ni Nanoframe Electrocatalysts" Journal of be American Chemical Society 2017 139 (34), 11678-11681.

Z. Wang, et al., "Synthesis of Pd Nanoframes by Excavating Solid Nanocrystals for Enhanced Catalytic Properties" ACS Nano 2017, 11, 163-170.

Luo et al., "Concave Platinum-Copper Octopod Nanoframes Bounded with Multiple High-Index Facets for Efficient Electrooxidation Catalysis." American Chemical Society Nano, Sep. 23, 2016.

Tao, "Excavation of Precious-Metal-Based Alloy Nanoparticles for Efficient Catalysis." Angewandte Chemie, vol. 55, pp. 2-5, 2016.

Du et al., "High-Quality and Deeply Excavated Pt3Co Nanocubes as Efficient Catalysts for Liquid Fuel Electrooxidation." Chemistry of Materials, pp. A-E, Nov. 8, 2017.

Jia et al., "Unique Excavated Rhombic Dodecahedral PtCu3 Alloy Nanocrystals Constructed with Ultrathin Nanosheets of High-Energy {110} Facets." Journal of the American Chemical Society, vol. 136, pp. 3748-3751, Feb. 28, 2014.

* cited by examiner

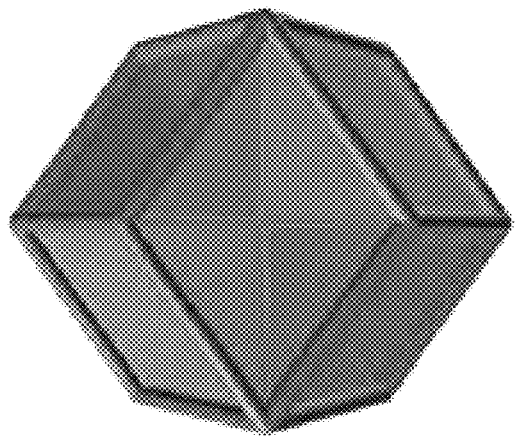 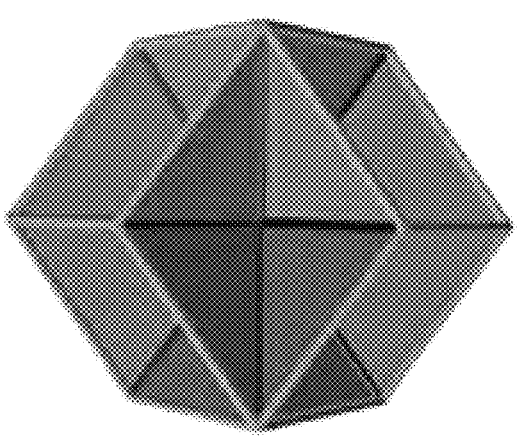
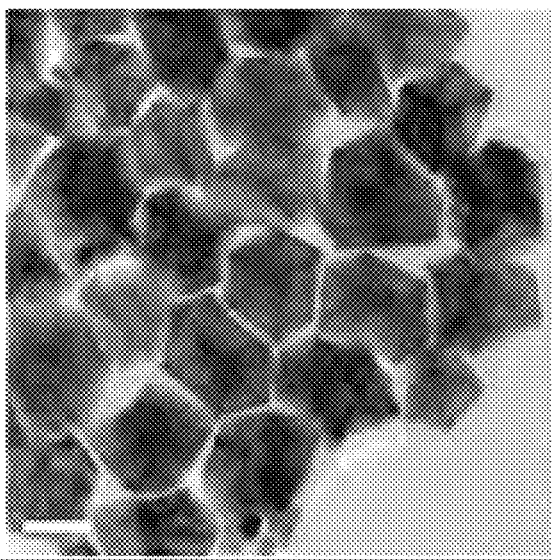 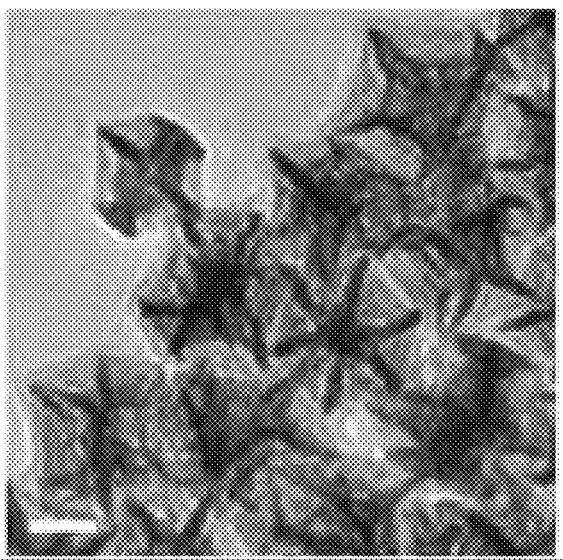
Figure 1A
Figure 1B

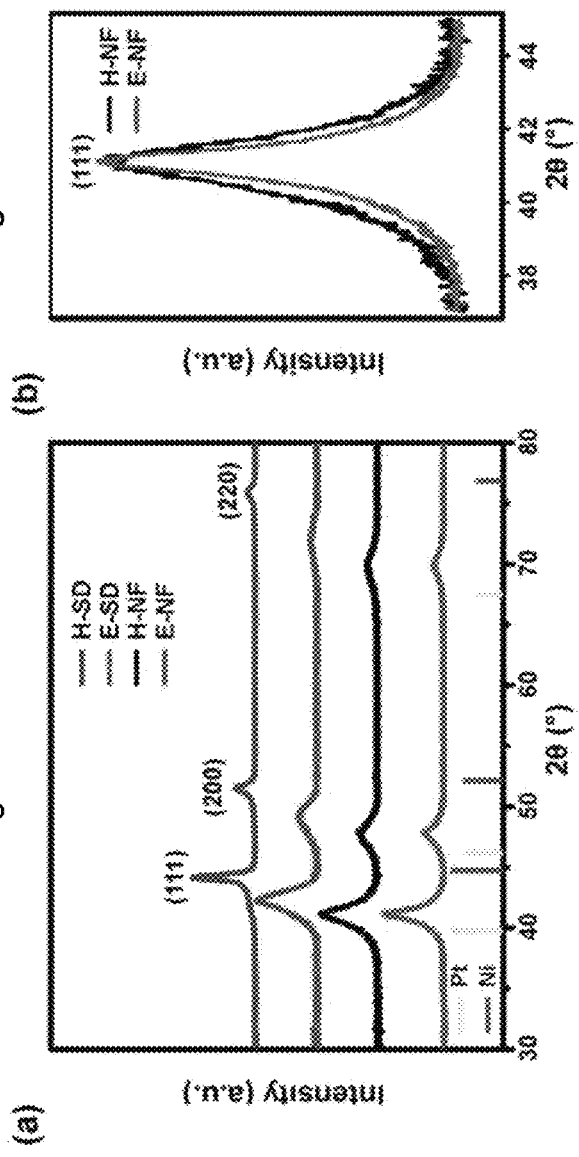
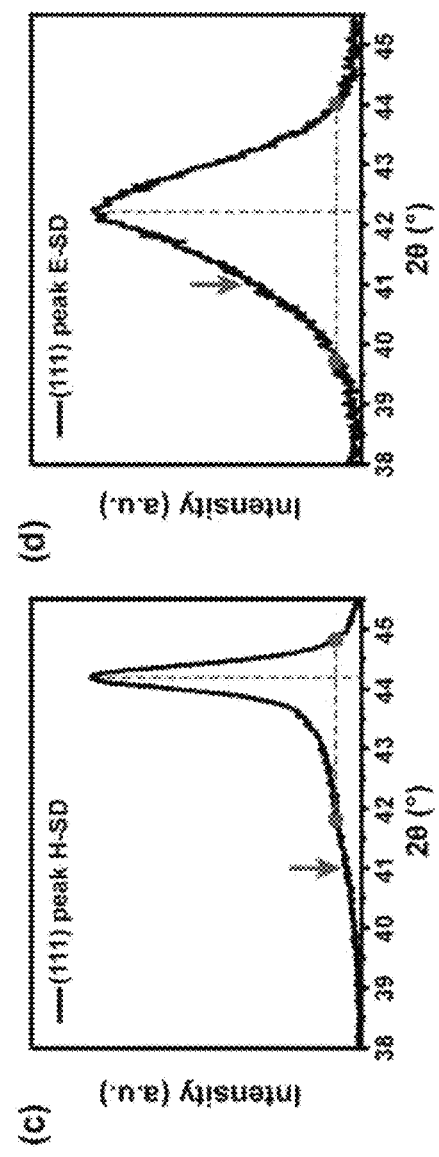
Figure 5A
Figure 5B
Figure 5C
Figure 5D

EXCAVATED NANOFRAMES WITH THREE-DIMENSIONAL ELECTROCATALYTIC SURFACES

RELATED APPLICATIONS

This application claims priority to U.S. Provisional Patent Application No. 62/479,580, filed Mar. 31, 2017, which is herein incorporated by reference.

STATEMENT OF GOVERNMENT RIGHTS

This invention was made with government support under Contract No. DE-AC02-05CH11231 awarded by the U.S. Department of Energy. The government has certain rights in the invention.

TECHNICAL FIELD

The present disclosure relates to the field of electrocatalytic materials, and more particularly to electrocatalytic nanoframes, methods, and uses thereof.

BACKGROUND

Catalysts based on platinum (Pt) and other precious metals are highly efficient for harvesting fuels and/or electrons from electrochemical interfaces. Efforts have been focused on the development of electrocatalysts that can meet the demands for high performance while maintaining a minimal precious metal content and cost. However, the high content of these costly materials combined with their insufficient activity and durability have been obstacles for their broad deployment in high energy density technologies, such as fuel cells and metal-air batteries.

Alloying platinum with one or more transition metal represents an effective approach for the reduction of platinum content in electrocatalysts by increasing the intrinsic activity of the electrocatalysts. While nanoscale electrocatalysts provide substantially enhanced utilization of precious metals, they continue to lack the requisite activity and durability to enable large-scale commercialization of these technologies.

BRIEF DESCRIPTION OF THE DRAWINGS

The present disclosure is illustrated by way of example, and not by way of limitation, in the figures of the accompanying drawings in which like references indicate similar elements.

FIG. 1A shows an illustration of an initial polyhedral nanoparticle and an accompanying micrograph according to an embodiment of the disclosure.

FIG. 1B shows an illustration of a final state of an excavated nanoframe and an accompanying micrograph according to an embodiment of the disclosure.

FIG. 5A shows powder x-ray diffraction patterns for various nanoframes.

FIG. 5B shows the magnified and overlapped peak width of the 111 orientation for hollow nanoframes and excavated nanoframes.

FIG. 5C shows the asymmetry of the 111 orientation peak for hollow solid rhombic dodecahedron nanoparticles.

FIG. 5D shows the asymmetry of the 111 orientation peak for excavated solid rhombic dodecahedron nanoparticles.

BRIEF SUMMARY

Figure 1C:
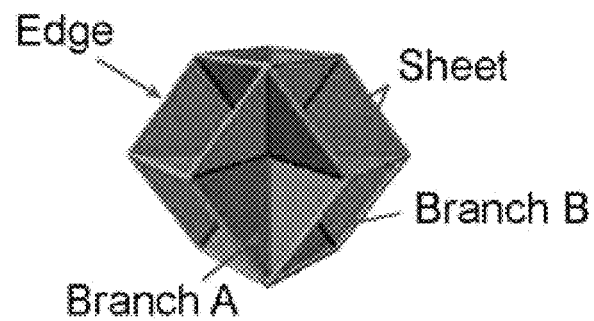
FIG. 1C shows an excavated nanoparticle together with terminology used to describe the locations of the atoms.
Figure 1C:
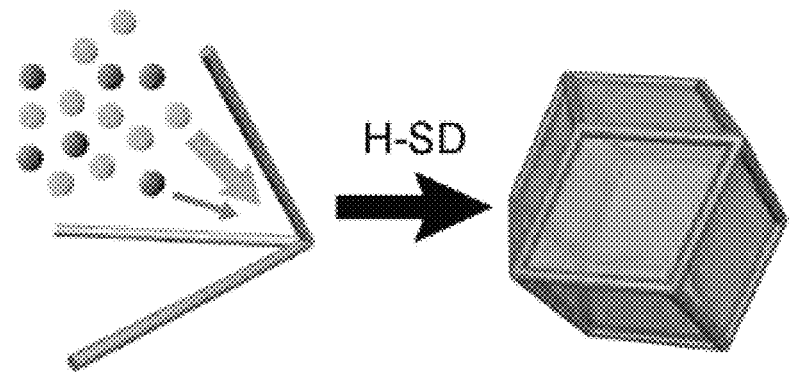

In accordance with various aspects, the disclosure relates to a metallic excavated nanoframe comprising a plurality of branches and a plurality of edges that connect to form a rhombic dodecahedral shape, and a plurality of sheets within an interior of the excavated nanoframe, wherein the plurality of sheets are proximate the plurality of branches and edges. The excavated nanoframe can include an electrochemically-active surface area to volume ratio of about 0.05 $nm^{-1}$ to about 1.5 $nm^{-1}$ and an electrochemically-active surface area to volume ratio of about 0.5 $nm^{-1}$ to about 0.8 $nm^{-1}$. According certain aspects, the excavated nanoframes comprise a composition of a form of $X_nY_m$, wherein X is a first transition metal selected from a group consisting of platinum (Pt), palladium (Pd), rhodium (Rh), and gold (Au), and wherein Y is a second transition metal selected from a second group consisting of nickel (Ni), iron (Fe), copper (Cu), and cobalt (Co), and wherein n and m are each an integer greater than zero. For example, the excavated nanoframe can comprise a platinum-nickel alloy of the formula $Pt_{60}Ni_{40}$, $Pt_{65}Ni_{35}$, or $Pt_{70}Ni_{30}$. According to certain aspects, the Pt is at a concentration of greater than 80% by weight of the metallic nanoframe and in aspects the plurality of edges and sheets are Pt-rich. The plurality of sheets may be adjacent to the plurality of branches and edges.

The disclosure further relates to a method comprising providing a plurality of excavated nanoparticles; and converting the plurality of excavated nanoparticles into a plurality of excavated nanoframes, each excavated nanoframe comprising a plurality of branches and a plurality of edges that connect to form a rhombic dodecahedral shape, the excavated nanoframes further comprising a plurality of sheets within an interior of the excavated nanoframe, wherein the plurality of sheets are adjacent to the plurality of branches and edges. In certain aspects, the method can include providing a plurality of excavated nanoparticles comprises reacting platinum (Pt) with nickel (Ni) to form the plurality of excavated nanoparticles, wherein a mole ratio of the Pt to the Ni is from about 0.25:1 to about 10:1, or from about 0.85:1 to about 1:1, wherein converting the plurality of excavated nanoparticles comprises exposing a solution comprising the plurality of excavated nanoparticles to chemical corrosion for a time duration to allow the plurality of excavated nanoparticles to undergo a reaction with a corrosive chemical. According to various example aspects of the disclosure, each excavated nanoparticle of the plurality of excavated nanoparticles can comprise Pt and Ni, wherein a mass ratio of the Pt to the Nickel is from about 5 to about 14. In accordance with various example aspects, a first transition metal is present in each of the plurality of excavated nanoparticles at a first mole percent and in each of the plurality of excavated nanoframes at a second mole percent, and a second transition metal is present in each of the plurality of excavated nanoparticles at a third mole percent and in each of the plurality of excavated nanoframes at a fourth mole percent, wherein the second mole percent is greater than the first mole percent, and wherein the third mole percent is greater than the fourth mole percent. In certain aspects, each excavated nanoframe comprises an electrochemically-active surface area to volume ratio of about 0.3 $nm^{-1}$ to about 2.5 $nm^{-1}$. The time duration can range from about 2 hours to about 8 hours, or about 2 to about 4 hours. The method can include maintaining a temperature of the solution at about 100° C. to about 200° C. during the time duration. In certain aspects, the plurality of excavated nanoparticles comprise solid rhombic dodecahedral nanoparticles. According to further example aspects of the disclosure, each excavated nanoparticle of the plurality of excavated nanoparticles can comprise a composition of a form of $X_nY_m$, wherein X is a transition metal selected from a first group consisting of Pt, Pd, Rh, and Au, and Y is a metal selected from a second group consisting of Ni, Fe, Cu, and Co, and wherein n and m are each an integer greater than zero. The plurality of excavated nanoparticles can comprise $Pt_{29}Ni_{71}$, and the plurality of excavated nanoframes can comprise $Pt_{65}Ni_{35}$. The method can further include depositing the plurality of excavated nanoframes onto an electrode; and annealing the plurality of excavated nanoframes.

In yet further example aspects, the disclosure provides an electrode comprising a solvent-accessible surface; and a plurality of excavated nanoframes disposed on the solvent-accessible surface, wherein each excavated nanoframe comprises a plurality of branches and a plurality of edges that connect to form a rhombic dodecahedral shape; and a plurality of sheets within an interior of the excavated nanoframe, wherein the plurality of sheets are proximate the plurality of branches and edges. The electrode may have a mass activity greater than 4 A $mg^{-1}$ Pt at 0.9 V when the electrode is incorporated into an electrochemical cell.

DETAILED DESCRIPTION

Described herein are excavated nanoframes and methods of producing excavated nanoframes. The embodiments herein utilize morphological and compositional evolution of solid nanoparticles into highly electrochemically active excavated nanoframes while maintaining size and symmetry. The excavated nanoframes are crystalline and bimetallic or trimetallic. The excavated nanoframes may include catalytic metals, such as platinum, that may be distributed along electrocatalytic, solvent-accessible surfaces. The resulting excavated nanoframes contain interior Pt—Ni that exhibit high electrocatalytic activity.

As used herein, the term "nanoframe" or "NF" refers to a nanostructured material that includes a plurality of interconnected branches arranged to form the edges of a polyhedron. An overall surface area to volume ratio (surface-to-volume ratio) of the nanoframe is greater than that of an identically shaped polyhedral particle having a solid interior volume (i.e., prior to formation of the nanoframe).

As used herein the term "hollow nanoframe" refers to a nanoframe as defined above that has a hollow interior volume of the polyhedron.

As used herein the term "excavated nanoframe" refers to a nanoframe as defined above that includes one or more interior sheets inside the polyhedron.

As used herein the term "interior sheet" refers to material that extends inward from the edges of a three-dimensional nanostructured material toward the center of the polyhedron.

As used herein the term "nanoparticle" refers to a particle having a polyhedron shape and a solid interior volume. Nanoparticles undergo processing to form nanoframes.

As used herein the term "SD" refers to a solid nanoparticle having a rhombic dodecahedron shape.

As used herein the term "hollow nanoparticles" or "H-SD" refers to nanoparticles that are used to form hollow nanoframes.

As used herein the term "excavated nanoparticles" or "E-SD" refers to nanoparticles that are used to form excavated nanoframes.

Hollow nanostructures have been prepared by methods, including template-directed synthesis (which are subtractive techniques that rely on the removal of micro-/nano-beads), treatments based on the Kirkendall effect, and/or the galvanic displacement reactions. Others have reported a synthetic mechanism for forming Pt—Ni solid rhombic dodecahedron nanoparticles that begins with forming Pt-rich branches and edges followed by step-induced Ni deposition between the branches and edges. See Yang et al., Anisotropic Phase Segregation and Migration of Pt in Nanocrystals en route to Nanoframe Catalysts, Nature Materials, vol. 15, 1188-1195 (Aug. 15, 2016). The embodiments described herein allow for the development of electrocatalysts that have polyhedron frames with interior sheets that, in combination with high surface-to-volume ratios, improve upon currently reported electrochemical activities when integrated into electrochemical devices.

In some embodiments, Pt—Ni excavated nanoparticles, which are highly crystalline rhombic dodecahedra, are synthesized and then converted into Pt—Ni excavated nanoframes that maintain the geometry of the polyhedral nanoparticles. The synthesized Pt—Ni excavated nanoparticles have a different element spatial distribution than, for example, Pt—Ni hollow nanoparticles. In addition, the excavated nanoparticles have Pt-rich edges together with Pt-rich interior sheets inside the dodecahedra. The term "Pt-rich" as used herein refers to greater than 50% platinum. The resulting Pt—Ni excavated nanoframes may have up to 24 remaining edges, in some embodiments. The frame-like structure together with the interior sheets provides a high surface-to-volume ratio (e.g., ratio of the solvent-accessible or electrocatalytic surface area to the overall volume of the nanoframe) and efficient reactant mass-transport to the interior and exterior catalytic surfaces. Catalysts based on Pt—Ni nanoframes, in particular, can achieve over 36 and 22-fold enhancement in mass and specific activities, respectively, for the oxygen reduction in comparison to current Pt/C catalysts. During prolonged exposure to reaction conditions, the structure, overall composition, and functional properties of nanoframes remain unchanged, demonstrating their high durability.

The excavated nanoframes described herein provide several advantages over other catalytic materials and methods of production. A first advantage is the unique geometry and structure of the nanoframes with the interior sheets, which addresses some of the major design criteria for advanced nanoscale electrocatalysts, namely high surface to volume ratio, 3-dimensional surface molecular accessibility, and optimal precious metal utilization. Reactant molecules (e.g., oxygen ($O_2$)) can approach the catalytic surfaces of the nanoframes from any direction, thus significantly increasing their functionality. The superior catalytic activity of ionic-liquid encapsulated Pt—Ni nanoframes along with their minimal precious metal content distinguish them as a highly efficient electrocatalyst that could ultimately drive the widespread adoption and integration of renewable energy technologies such as fuel cells and electrolyzers.

A second advantage of the embodiments described herein is that they allow for the spontaneous structural evolution of solid nanoparticles into crystalline nanoframes with controlled size, structure, and composition. The embodiments described herein are not limited to any one composition (e.g., Pt—Ni nanoframes), but are compatible with other multimetallic electrocatalytic materials such as platinum-iron (Pt—Fe), platinum-cobalt (Pt—Co), platinum-copper (Pt—Cu), platinum-rhodium-nickel (Pt—Rh—Ni), and platinum-palladium-nickel (Pt—Pd—Ni). In some embodiments, preparation of nanoframes can be scaled-up to produce catalysts at the gram-scale.

A third advantage of the embodiments described herein is that they provide a general strategy for the design and synthesis of well-defined, multimetallic nanomaterials having interior sheets, and also having accessible surfaces, enabling high electrocatalytic efficiency and maximal utilization of precious metals in materials suitable for energy storage and conversion technologies.

Reference is now made to the accompanying drawings, which illustrate the features and advantages of the disclosed embodiments. It is noted that, while Pt—Ni nanoframes are discussed throughout, Pt—Ni nanoframes are used to illustrate various aspects of the present embodiments and are not to be construed as limiting.

FIGS. 1A-1B illustrate the evolution of excavated nanoparticles in accordance with an embodiment of the disclosure. FIG. 1A illustrates a Pt—Ni polyhedron and a corresponding micrograph of Pt—Ni polyhedra obtained with a transmission electron microscope (TEM). The Pt—Ni polyhedra of FIG. 1A have a uniform rhombic dodecahedron morphology with single crystallinity, as observed along three representative zone axes as shown in FIG. 2A. The particle sizes of the Pt—Ni excavated nanoparticles were about 15 nm to about 25 nm, about 18 nm to about 22 nm, or 20.1±1.9 nm. The excavated nanoparticles have interior sheets (e.g., sheet-like structures extending inward from the edges of the nanoframe) as shown in FIGS. 1A-1B and 2A.

Nanoframes may be formed under a variety of conditions using different precursors, solvents, temperatures, and time durations. FIGS. 1A-1B show TEM micrographs of two representative stages of acetic acid treatment (0 hours and 2 hours), respectively. The initially solid excavated nanoparticles (FIG. 1A) gradually erode into excavated nanoframes with a compositional change from $Pt_{29}Ni_{71}$ to $Pt_{65}Ni_{35}$ (FIG. 1B). The final $Pt_{65}Ni_{35}$ excavated nanoframe maintains the symmetry and single crystallinity of its parent $Pt_{29}Ni_{71}$ polyhedron, having interior sheets and 24 edges (approximately 3 nm to 4 nm in diameter) remaining. In some embodiments, the excavated nanoframes may be further processed. For example, after dispersion of $Pt_{65}Ni_{35}$ excavated nanoframes onto a high surface area carbon support (e.g., Vulcan XC-72) and subsequent thermal treatment at a temperature of about 180° C. to about 200° C., the $Pt_{65}Ni_{35}$ excavated nanoframes are prepared for electrocatalytic testing. In some embodiments, the excavated nanoframes may be dispersed on other types of supports (e.g., silica powder, silica substrates, etc.), and other annealing temperatures may be used.

Figure 1D:
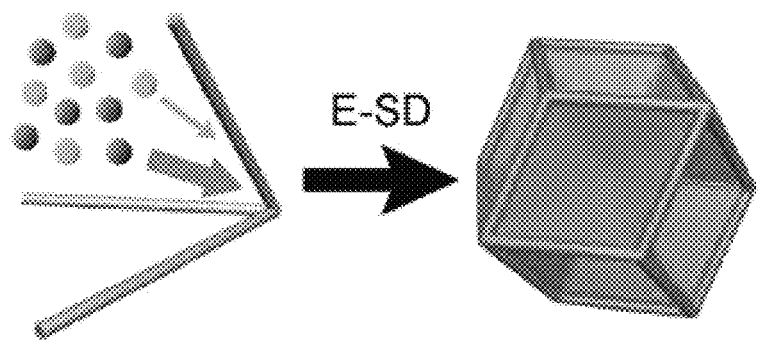
FIG. 1D shows the formation of hollow nanoparticles as compared to excavated nanoparticles.
Figure 2A:
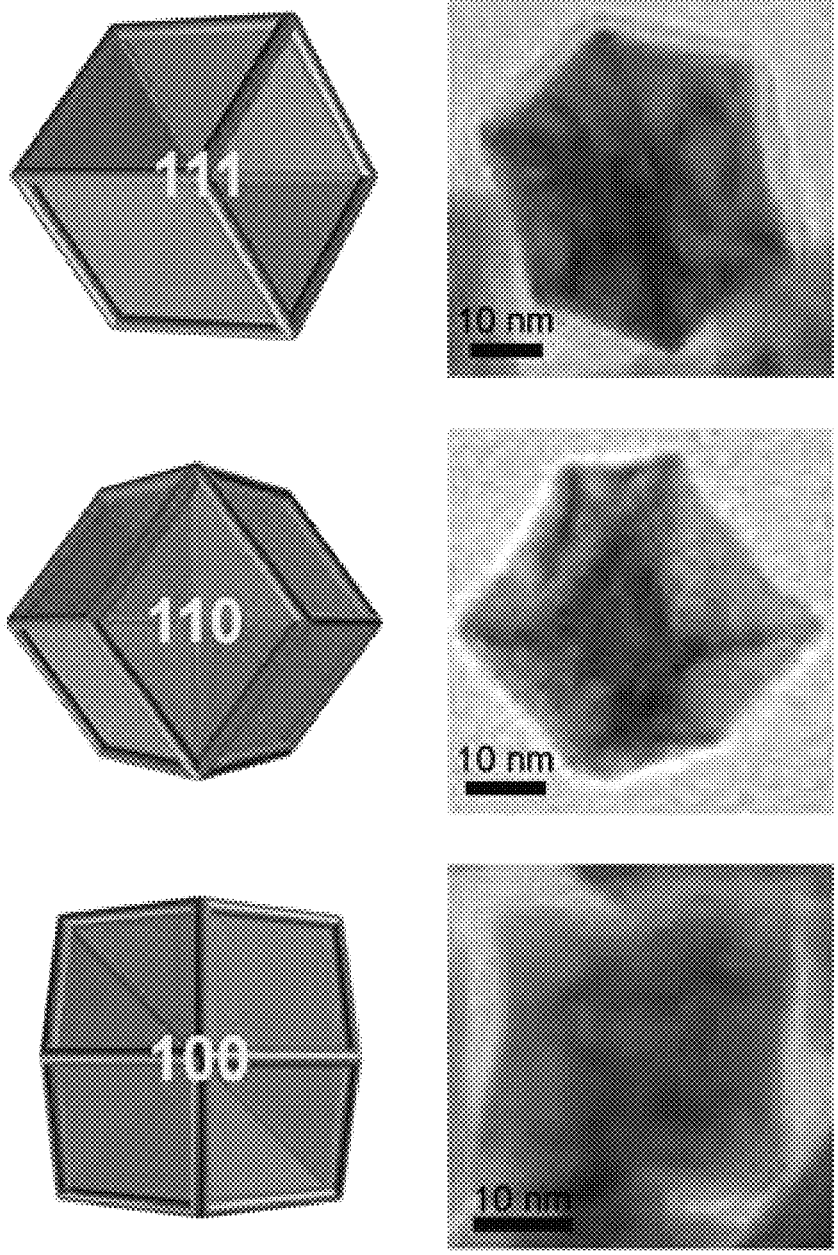
FIG. 2A shows illustrative projections of an initial polyhedral nanoparticle and an accompanying micrographs according to an embodiment of the disclosure.

FIGS. 1C and 1D provide a description of the locations of the atoms in excavated nanoparticles and also show the synthesis of hollow nanoparticles as compared to excavated nanoparticles. FIG. 1C provides an explanation of terminology used to describe the locations of the atoms. On its exterior, the excavated rhombic dodecahedron has 24 edges. On its interior, it also has 6 branches of type A and 8 branches of type B that extend from the origin to each vertex. Branch A grows in the <100> direction while branch B grows in the <111> direction. There are 24 triangular sheets whose sides are made up of one branch A, one branch B, and one edge. With respect to FIG. 1D, the synthetic mechanism for the formation of Pt—Ni rhombic dodecahedra suggests that solid dodecahedra (H-SD), which can be etched into hollow nanoframes (H-NF), are formed by Ni deposition that is favored (indicated by the thick arrow) between branch sites. Therefore, after lowering the Ni precursor concentration (for E-SD), Pt deposition became more favorable, leading to solid dodecahedra (E-SD) that can be etched into excavated nanoframes (E-NF). Eleven of the fourteen branches have been left out of the scheme for clarity.

During the synthesis of the excavated nanoparticles, the amount of nickel (Ni) precursor used was less than the amount of Ni precursor previously used to synthesize hollow nanoparticles. This adjustment in Ni concentration reduces the Ni chemical potential in the synthesis resulting in a faster rate of step-induced deposition of Pt, which provides a more Pt-rich Pt—Ni excavated nanoparticle as compared to a Pt—Ni hollow nanoparticle. During the growth process, the excess Pt deposited between Pt-rich branches segregates to the edges, resulting in Pt-rich interior sheets inside the excavated nanoparticle as shown in FIG. 1D. The interior sheets are bordered by both interior branches and exterior edges of the nanoframe. Ni preferentially deposits in the concave sites formed by the growing branches and sheets in order to fill out the rhombic dodecahedron. These excavated nanoparticles result in excavated nanoframes (after Ni corrosion) containing not only Pt-rich edges but also Pt-rich, (110)-terminated interior sheets extending inward from the edge of the nanoframe. As will be discussed in more detail below, the excavated nanoframes have enhanced specific activity for the oxygen reduction reaction (ORR) as compared to hollow nanoframes due to their extended surface facets, and can maintain a high mass activity due to the thin dimension of the interior sheet.

Figure 2B:
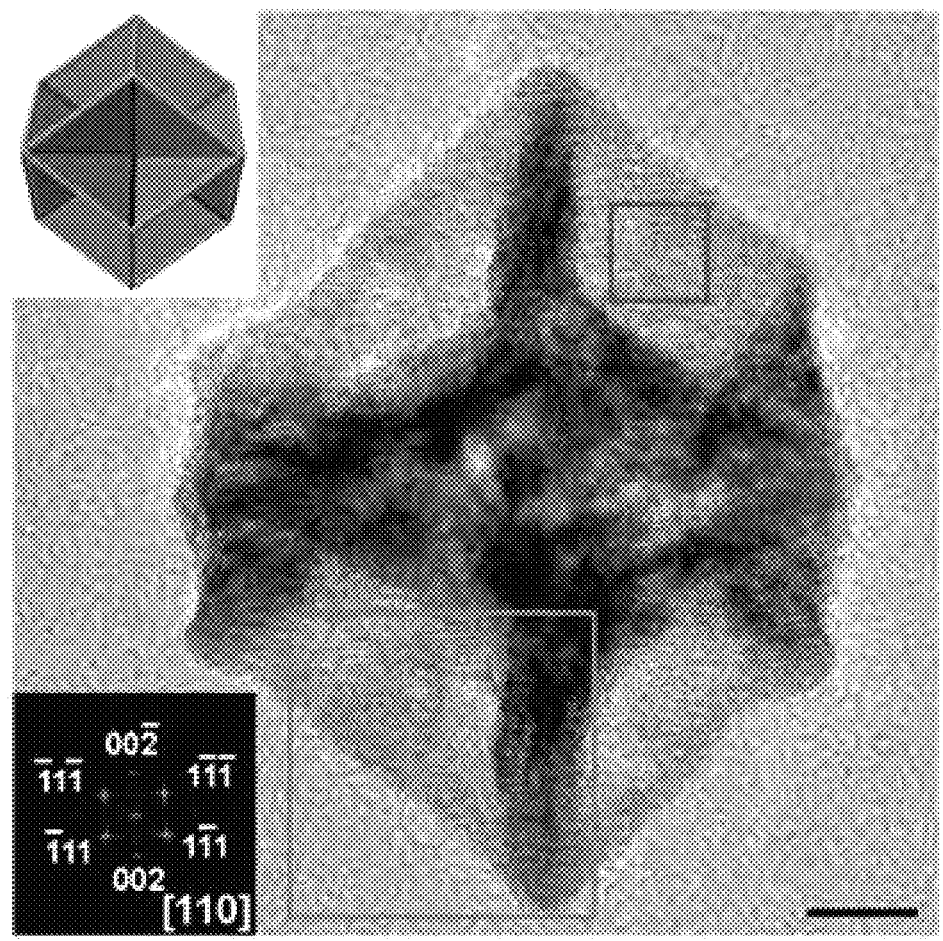
FIG. 2B shows a high-resolution transmission electron microscope (HRTEM) image of the excavated nanoframe oriented in <110> direction.

During the formation process of the excavated Pt—Ni rhombic dodecahedra, a branched nanoparticle forms from an initial nucleated seed. Under a higher Pt concentration than Ni, Pt can be deposited between the branch sites to such a degree that some Pt will stay inside the excavated nanoparticle even after the formation of Pt-rich exterior edges. After chemical corrosion, the excess Pt deposited inside the excavated nanoparticle forms the interior sheet structure that is bounded by the interior branches and exterior edges. The most probable model for excavated nanoframes (E-NF) is based on the mechanism of Pt—Ni rhombic dodecahedron formation and TEM and SEM images collected for E-NF. In this model, all inner sheets are perpendicular to the <110> direction and it is therefore expected that the sheets will have {110} surface facets. To confirm this model, high-resolution TEM (HRTEM) images of E-NF were taken. Although most 2-D projections of this model contain two overlapping sheets, if the model E-NF is oriented in the <110> direction, a region can be observed where the electron beam must pass through only one sheet. The HRTEM image in FIG. 2B corresponds well with the model of E-NF oriented in the same direction. The fast Fourier transform (FFT) of a single sheet (bottom left inset) confirmed that E-NF was oriented in the <110> direction. The sheet structures were found to remain in the {110} planes extending inward from the edges of the excavated nanoframe after chemical corrosion, suggesting that they may be terminated with primarily {110} facets.

In embodiments that utilize the Pt—Ni excavated nanoparticles as the starting material, it is believed (without being bound by any particular theory) that in the presence of dissolved oxygen (equilibrated from air), the surface Ni atoms are more susceptible to being oxidized than Pt atoms due to the difference in their respective chemical activities. The Ni 2p and Pt 4f XPS spectra of PtNi$_3$ polyhedra obtained in vacuum (Al Kα, hv=1486.6 eV) indicate that the majority of Ni on the surface is in the oxidized state while Pt is mainly in the metallic state.

During the morphological evolution from excavated nanoparticles to excavated nanoframes, the dissolution may take place preferentially in the interior of the excavated nanoparticles rather than on their edges. This may occur, for example, as a result of an inhomogeneous elemental distribution of the excavated nanoparticles. For example, in some embodiments, each excavated nanoparticle may include a first metal (e.g., Pt) and a second metal (e.g., Ni), and a mass ratio of the first metal to the second metal may increase along a radial direction from an outer surface of the nanoparticle to a center of the nanoparticle (e.g., a Pt concentration increases with respect to a Ni concentration from the outer surface of the nanoparticle to the center of the nanoparticle). For example, for a given radial axis extending from the center of the nanoparticle to an edge would have a high Pt:Ni ratio, while a different radial axis extending from the center to the surface (not an edge) would have a much lower Pt:Ni ratio. In some embodiments, the mass ratio may vary continuously.

Driving forces for elemental distributions in the excavated nanoparticles may be based on different nucleation rates between Pt and Ni during initial seed growth into polyhedral nanoparticles. During the evolution process of an excavated nanoparticle, this may lead to stable Pt—Ni phase formation on the edges and within interior sheets as the Ni species preferentially dissolves in the interior of the nanoparticle, i.e., owing to a relatively high ratio of Pt to Ni as compared to the hollow nanoparticles. The interior sheets inside the excavated nanoframe have a uniform distribution of Pt and Ni within the sheets.

Figures 3A, 3B:
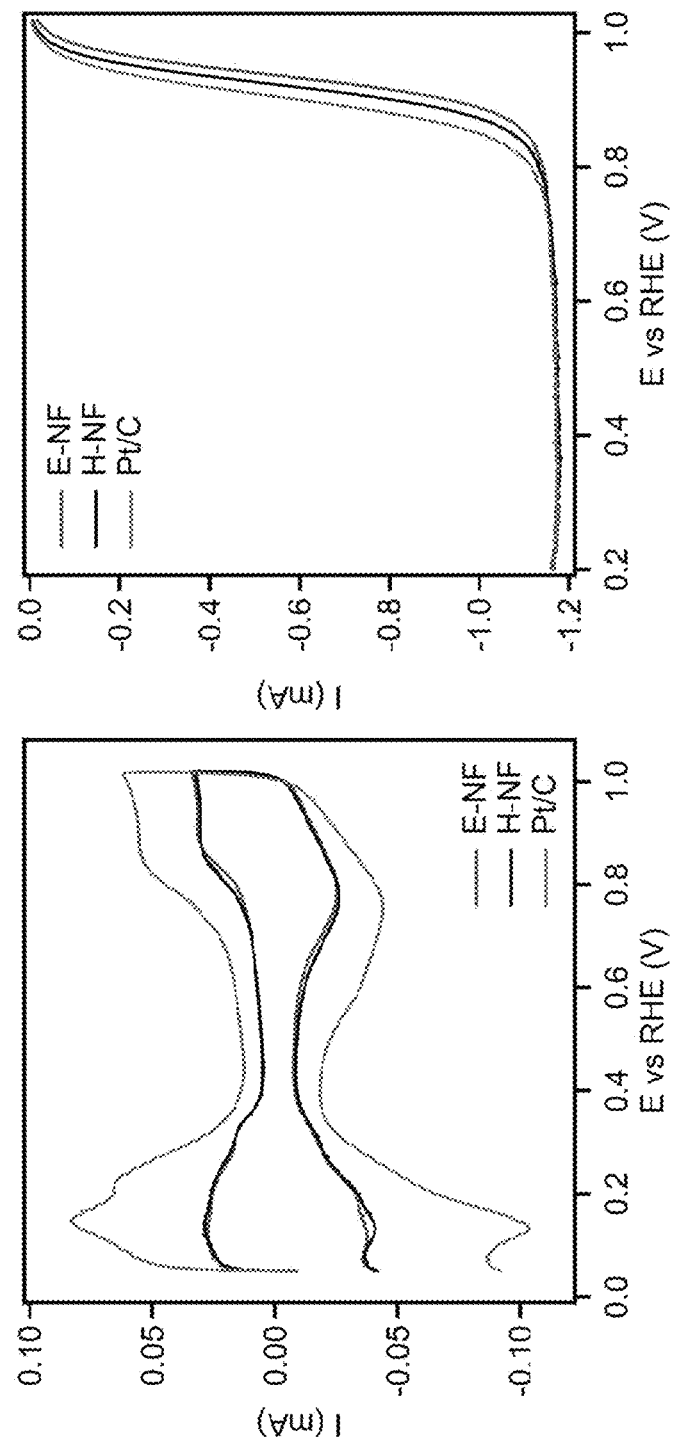
FIG. 3A shows cyclic voltammogram curves of platinum-nickel (Pt—Ni) nanoframes according to an embodiment of the disclosure.
FIG. 3B shows oxygen reduction reaction polarization curves according to an embodiment of the disclosure.

Highly open, three-dimensional hollow nanoframes and excavated nanoframes were loaded onto carbon supports to evaluate their catalytic performance toward oxygen reduction reaction (ORR). The dispersion of hollow nanoframes and excavated nanoframes is uniform on carbon supports. The electrocatalytic properties of Pt—Ni excavated nanoframes as compared to Pt—Ni hollow nanoframes and current Pt/C nanoscale electrocatalysts on carbon supports are shown in FIGS. 3A-3D. The Pt loading of H-NF and E-NF was set to 4.6 µg/cm$^2$, while that of commercial Pt/C was set to 7.8 µg/cm$^2$. The cyclic voltammograms (CV) shown in FIG. 3A illustrate that both nanoframe catalysts have high specific surface area (SSA) as measured by the hydrogen underpotential deposition ($H_{upd}$) process, with 60.2 m$^2$/g$_{Pt}$ for H-NF and 48.1 m$^2$/g$_{Pt}$ for E-NF, which are both slightly less than that of commercial Pt/C (76.1 m$^2$/g$_{Pt}$).

Figure 3D:
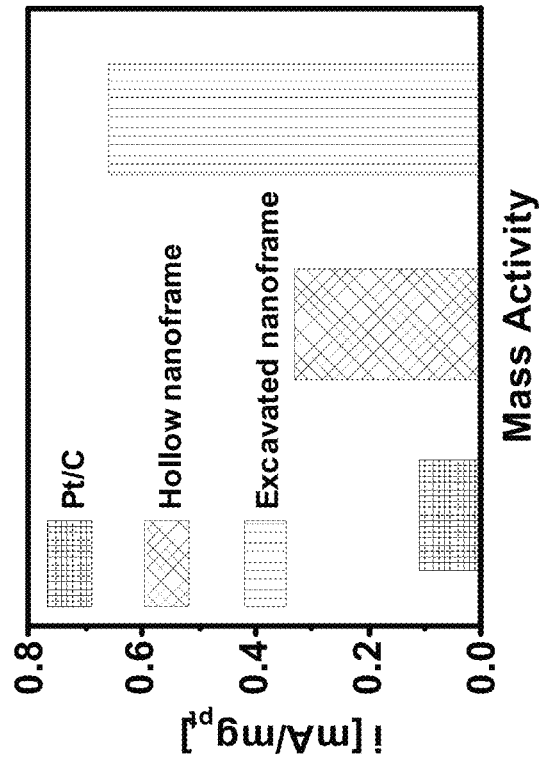
FIG. 3D shows mass activities for various catalysts according to an embodiment of the disclosure.
Figure 3C:
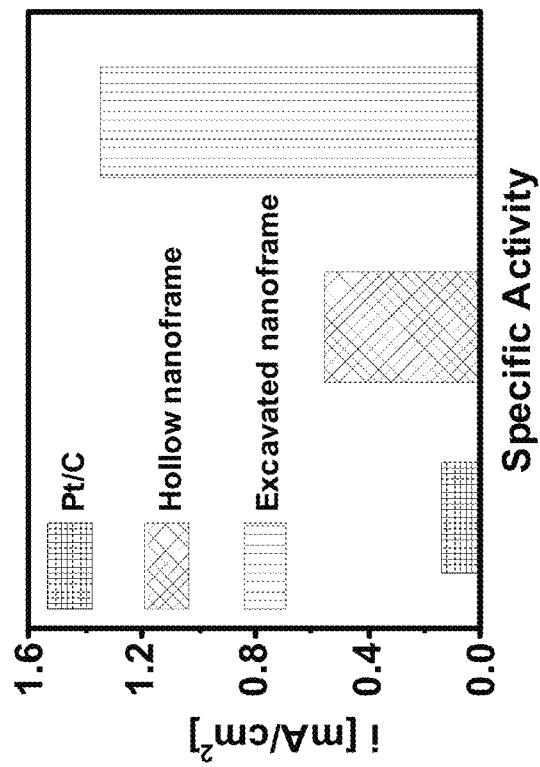
FIG. 3C shows specific activities for various catalysts according to an embodiment of the disclosure.

As shown in FIG. 3B, the ORR polarization curves demonstrate an increase in activity along with the shift in $H_{upd}$ or $OH_{ad}$ onset potential. The ORR measurement was performed in 0.1 M HClO$_4$ solution saturated with oxygen at a sweep rate of 20 mV/s and a rotation rate of 1600 rpm. The calculated kinetic current density at 0.95 V versus the reversible hydrogen electrode (RHE) was normalized over the electrochemically active surface area (ECSA) determined by $H_{upd}$ and Pt mass loading to give the specific activity and mass activity, respectively (FIGS. 3C and 3D). The catalytic specific and mass activities follow the order of Pt/C<H-NF<E-NF. E-NF exhibits the highest specific and mass activity, ~10 and 6 times higher than that of commercial Pt/C, respectively. E-NF/C shows specific activity of 1.35 mA/cm$^2$, a 145% specific activity enhancement compared with H-NF (0.55 mA/cm$^2$). Without being bound by any particular theory, the enhanced electrocatalytic performance of E-NF may be due to its extended surface facet compared with the surfaces of H-NF, indicating the importance of element spatial distribution control to the design of the final morphology of ORR catalysts for enhanced activity.

Table 1 shows calculations of surface area (A), volume (V), and surface-to-volume ratios (A/V) of a sphere morphology, a cuboctahedron morphology, a solid rhombic dodecahedron morphology, a hollow nanoframe morphology evolved from hollow nanoparticles, and an excavated nanoframe evolved from excavated nanoparticles.

TABLE 1

Surface Area of Various Particle Morphologies

| | Sphere | Cubocta-hedron | Solid Rhombic Dodecahedron | Hollow Nanoframe | Excavated Nanoframe |
|---|---|---|---|---|---|
| Area (A) | $4\pi r^2$ | $(6 + 2\sqrt{3})a^2$ | $8\sqrt{2}a^2$ | $24\pi da$ | $16\sqrt{2}a^2 + 24ad$ |
| Volume (V) | $\frac{4}{3}\pi r^3$ | $\frac{5}{3}\sqrt{2}\,a^3$ | $\frac{16}{9}\sqrt{3}\,a^3$ | $6\pi ad^2$ | $384\sqrt{2}a^2d$ |
| A/V | 1.2 nm$^{-1}$ | 0.574 nm$^{-1}$ | 0.367 nm$^{-1}$ | 2 nm$^{-1}$ | 0.8 nm$^{-1}$ |
| A/V$_{Pt}$ | 2.070 nm$^{-1}$ | 0.574 nm$^{-1}$ | 1.165 nm$^{-1}$ | 2.483 nm$^{-1}$ | 1.2 nm$^{-1}$ |
| Surface Area (Experimental) | 33.8 m$^2$g$^{-1}$Pt | 14.5 m$^2$g$^{-1}$Pt | 26.4 m$^2$g$^{-1}$Pt | 60.2 m$^2$g$^{-1}$Pt | 48.1 m$^2$g$^{-1}$Pt |

The bottom row corresponds to surface areas of Pt—Ni spherical nanocrystals with a diameter of 4 nm, Pt cuboctahedra with an edge length of 7 nm, PtNi$_3$ solid rhombic dodecahedra with an edge length of 10 nm, Pt$_3$Ni hollow nanoframes with an edge length of 15 nm and Pt—Ni excavated nanoframes with an edge length of 15 nm. The experimentally measured surface areas were obtained by electrochemical evaluation in accordance with the embodiments described herein.

Figure 4:
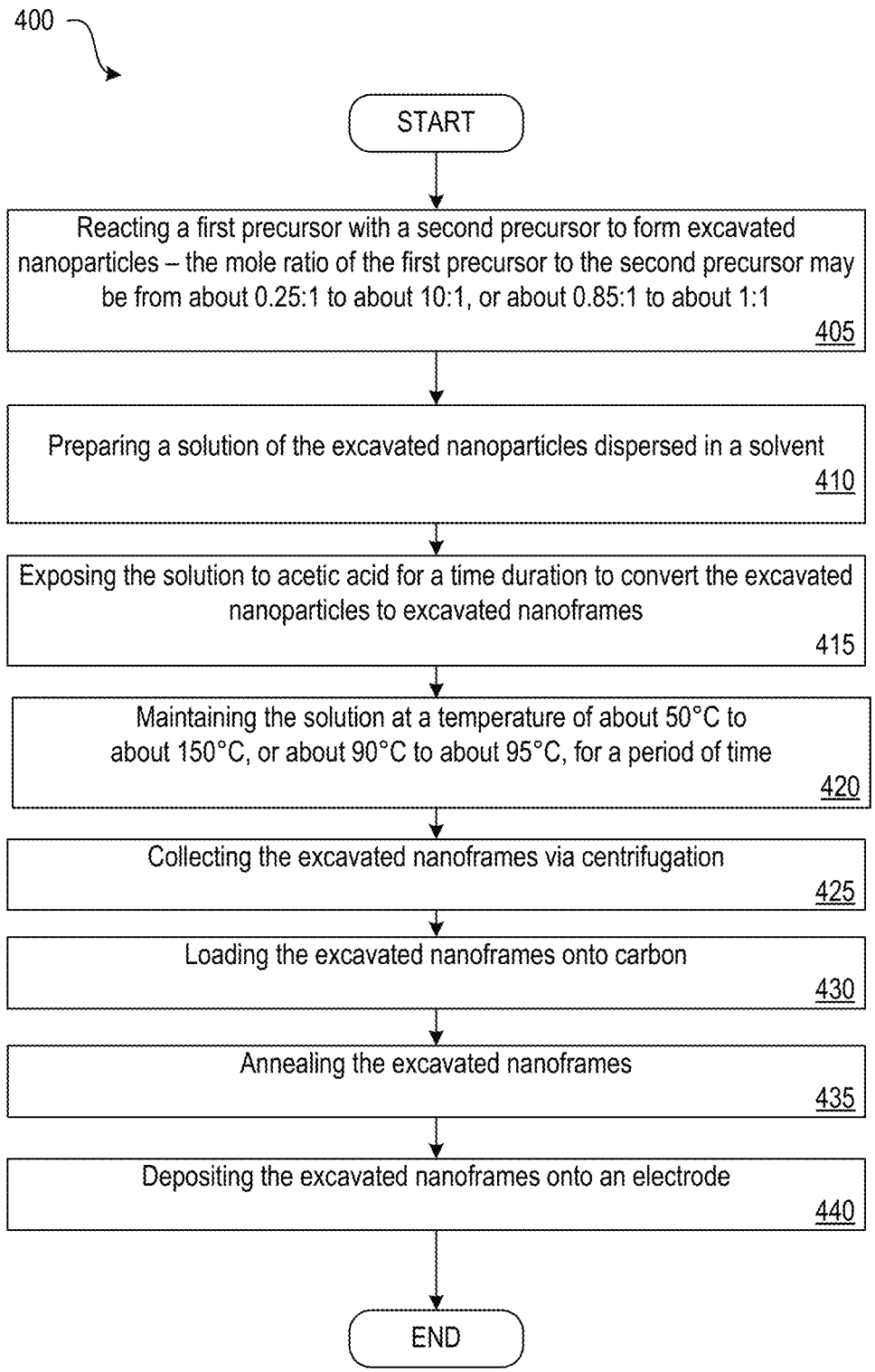
FIG. 4 is a flow chart illustrating a method for producing nanoframes according to an embodiment of the disclosure.
Figure 6A:
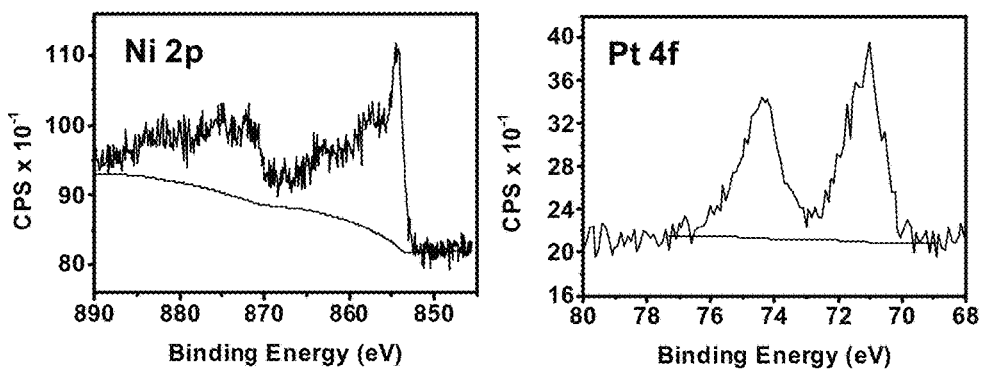
FIG. 6A is x-ray photoelectron spectra of the Ni 2p and Pt 4f core levels of Pt—Ni hollow solid rhombic dodecahedron nanoparticles.
Figure 6B:
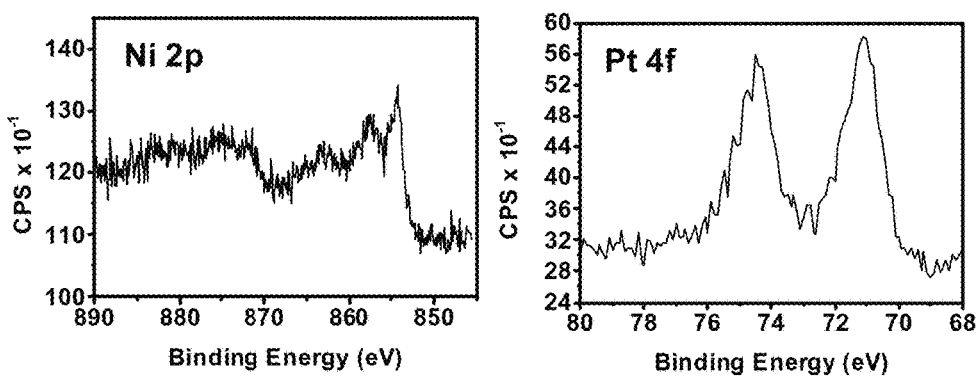
FIG. 6B is x-ray photoelectron spectra of the Ni 2p and Pt 4f core levels of Pt—Ni excavated solid rhombic dodecahedron nanoparticles.
Figure 6C:
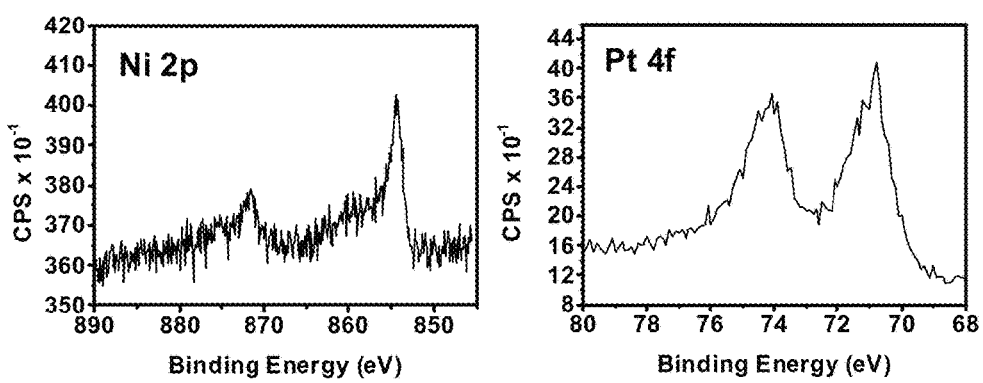
FIG. 6C is x-ray photoelectron spectra of the Ni 2p and Pt 4f core levels of Pt—Ni hollow nanoframes.
Figure 6D:
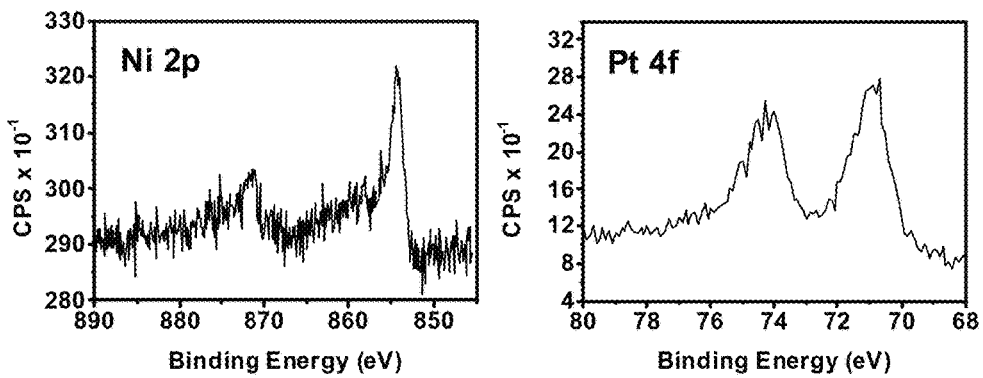
FIG. 6D is x-ray photoelectron spectra of the Ni 2p and Pt 4f core levels of Pt—Ni excavated nanoframes.

FIG. 4 is a flow chart illustrating a method 400 for producing excavated nanoframes according to an embodiment of the disclosure. Method 400 may be performed to produce any of the nanoframes described herein (e.g., Pt—Ni excavated nanoframes).

Referring now to FIG. 4, at block 405, a first precursor may be reacted with a second precursor to synthesize excavated nanoparticles. The mole ratio of the first precursor to the second precursor may be from about 0.25:1 to about 10:1, or about 0.85:1 to about 1:1. At block 410, a solution is provided that includes the excavated nanoparticles dispersed in a solvent. In one embodiment, one or more of the excavated nanoparticles is composed of a first metal and a second metal. In some embodiments, one or more of the excavated nanoparticles contains additional metals. For example, the excavated nanoparticles may each have a composition of a form of $X_nY_m$, where X is Pt, Pd, Rh, Au, or a different metal, and Y is Ni, Fe, Cu, Co, or a different metal. In some embodiments, X is a metal selected from a first group consisting of Pt, Pd, Rh, and Au, and wherein Y is a metal selected from a second group consisting of Ni, Fe, Cu, and Co. In one embodiment, one or more of the excavated nanoparticles are Pt$_{29}$Ni$_{71}$ nanoparticles. In one embodiment, the excavated nanoparticles include one or more of cubic nanoparticles, cuboctahedral nanoparticles, and/or solid rhombic dodecahedral nanoparticles. In one embodiment, the solvent is an organic solvent (e.g., toluene, or any other suitable solvent). In some embodiments, the excavated nanoparticles are a mixture of nanoparticles having different compositions, morphologies, and/or geometries.

At block 415, the solution is exposed to a corrosive chemical (e.g., acetic acid (CH$_3$COOH), nitric acid (HNO$_3$), sulfuric acid (H$_2$SO$_4$), hydrochloric acid (HCl), perchloric acid (HClO$_4$)) for a time duration to allow the excavated nanoparticles to undergo a reaction that converts the excavated nanoparticles into excavated nanoframes. For example, in some embodiments, the time duration ranges from about 1 hour to about 18 hours, from about 1 hour to about 14 hours, or about 2 hours to about 4 hours. In some embodiments, the time duration is about 12 hours, about 4 hours, about 3 hours, or about 2 hours.

In one embodiment, one or more of the excavated nanoframes are Pt$_{65}$Ni$_{35}$ excavated nanoframes. In one embodiment, a first mass percent of the first metal is greater than a second mass percent of the second metal prior to exposing the solution to the acetic acid, and wherein the first mass percent of the first metal remains greater than the second mass percent of the second metal after the time duration.

In one embodiment, a first metal is present in each of the excavated nanoparticles at a first mole percent (e.g., Pt at approximately 29%) and in each of the excavated nanoframes at a second mole percent (e.g., Pt at approximately 65%), and a second metal is present in each of the excavated nanoparticles at a third mole percent (e.g., Ni at approximately 71%) and in each of the excavated nanoframes at a fourth mole percent (e.g., Ni at approximately 35%). The second mole percent is greater than the first mole percent, and the third mole percent is greater than the fourth mole percent. In one embodiment, one or more of the excavated nanoframes has a composition of a form of $X_nY_m$, where X is Pt, Pd, Rh, Au, or a different metal, and wherein Y is Ni, Fe, Cu, Co, or a different metal. In one embodiment, one or more of the excavated nanoframes has a composition of a form of $X_nY_m$, wherein X is a metal selected from a first group consisting of Pt, Pd, Rh, and Au, and wherein Y is a metal selected from a second group consisting of Ni, Fe, Cu, and Co.

In one embodiment, at least one excavated nanoframe is a bimetallic nanoframe having a ratio of electrochemically-active surface-to-volume that is less than 1.5 nm$^{-1}$. In some embodiments, the ratio of electrochemically-active surface-to-volume is from about 0.05 nm$^{-1}$ to about 1.5 nm$^{-1}$, about 0.1 nm$^{-1}$ to about 1.0 nm$^{-1}$, about 0.25 nm$^{-1}$ to about 0.8 nm$^{-1}$, or about 0.5 nm$^{-1}$ to about 0.8 nm$^{-1}$. In one embodiment, the ratio of electrochemically-active surface-to-volume is about 0.8 nm$^{-1}$. The excavated nanoframe can include Pt at a concentration of greater than 60% by weight, or greater than 70% by weight, or greater than 80% by weight of the excavated nanoframe. In one embodiment, the Pt concentration is about 83% by weight. In one embodiment, the electrochemically-active surface area is formed by a portion of the Pt present in the interior sheets.

At block 420, a temperature of the solution is maintained at about 100° C. to about 200° C. during the time duration. In other embodiments, the temperature may be less than 100° C. (e.g., room temperature), or greater than 200° C. In some embodiments, the temperature may be held at a fixed temperature, or varied over the time duration.

At block 425, the excavated nanoframes are collected via centrifugation. In some embodiments, the centrifugation speed is from about 4000 rpm to about 12,000 rpm.

At block 430 the excavated nanoframes are loaded onto carbon.

At block 435, the excavated nanoframes are annealed. In some embodiments, the excavated nanoframes are annealed prior to depositing on the electrode (e.g., after incorporating onto a support). In some embodiments, an annealing temperature ranges from about 200° C. to about 400° C. In some embodiments, the annealing temperature ranges from about 350° C. to about 400° C.

At block 440, the excavated nanoframes are deposited onto an electrode. For example, the excavated nanoframes are incorporated onto a carbon support to form a catalyst. In some embodiments, the excavated nanoframes may be incorporated into an ink, which may be deposited onto the electrode. The electrode may be a glassy carbon electrode.

The excavated nanoframes may be disposed on a solvent-accessible surface of the electrode where the average solvent-accessible surface area of the excavated nanoframes is greater than 40 m$^2$/g. In one embodiment, a mass activity of the electrode is greater than 4 A mg$^{-1}$ Pt at 0.9 V when the electrode is incorporated into an electrochemical cell.

EXAMPLES

The following examples are set forth to assist in understanding the embodiments described herein and should not be construed as specifically limiting inventions described and claimed herein. Such variations of the embodiments, including the substitution of all equivalents now known or later developed, which would be within the purview of those skilled in the art, and changes in formulation or minor changes in experimental design, are to be considered to fall within the scope of the embodiments described herein.

Example 1—Synthesis of Hollow Nanoparticles and Excavated Nanoparticles

For hollow nanoparticles (H-SD), 20 mg H$_2$PtCl$_6$.6H$_2$O and 21.5 mg Ni(NO$_3$)$_2$.6H$_2$O were dissolved in 0.8 mL oleylamine. The solution was injected into 9.2 ml oleylamine which had been kept at 160° C. under Ar for one hour. The reaction was then kept under vacuum for 2.5 minutes. Then, the reaction was heated to 265° C. with a ramping rate of 15° C./minute under Ar atmosphere. The color of the reaction solution changed to black after reaching 265° C. The reaction was stopped 5 minute after the color turned to black. The reaction flask was transferred into a water bath in order to quench the growth process. The produced H-SD was washed twice with ethanol and hexane. For excavated nanoparticles (E-SD), the procedures were kept the same except that 20 mg H$_2$PtCl$_6$.6H$_2$O and 11.5 mg Ni(NO$_3$)$_2$.6H$_2$O were dissolved in 0.6 ml oleylamine and injected into 9.4 ml oleylamine.

Example 2—Corrosion of Nanoparticles to Form Nanoframes

For hollow nanoframes (H-NF), the H-SD were dispersed in 4 ml toluene and mixed with 4 ml acetic acid and 0.2 ml oleylamine, followed by heating at 90° C. in oil bath for 2 hours with reflux system. The collected sample was washed twice with ethanol and hexane.

For the excavated nanoframes (E-NF), the E-SD were dispersed in 4 ml toluene and mixed with 4 ml acetic acid and 0.2 ml oleylamine, followed by heating at 90° C. in an oil bath for 2 hours with reflux system. The collected sample was washed twice with ethanol and hexane.

Example 3—X-Ray Diffraction Patterns of Nanoframes and Nanoparticles

FIG. 5A shows powder X-ray diffraction (XRD) patterns of Pt—Ni hollow nanoframes (H-NF), Pt—Ni excavated nanoframes (E-NF), and the corresponding Pt—Ni nanoparticles (H-SD, E-SD) samples. All samples showed a face-centered cubic crystalline structure with diffraction peak positioning dependent on the composition of Pt and Ni. FIG. 5B shows the magnified and overlapped peak width of the (111) oriented peak for hollow nanoframes and excavated nanoframes. FIGS. 5C and 5D indicate the asymmetry of the (111) oriented peak in the XRD patterns of H-SD and E-SD. The (111) peak in the XRD pattern of H-SD exhibited more drastic asymmetry, which demonstrated obvious phase separation via Pt segregation. E-SD also revealed phase separation, though with less asymmetry. Additionally, the peak position of E-SD was at lower 2θ value than H-SD and the intensity to the left of the peak, as marked by arrows in FIGS. 5C and 5D, is much larger in E-SD, indicating a larger fraction of Pt-rich phases.

As shown in FIG. 5B, E-NF had narrower diffraction peaks than H-NF, with E-NF and H-NF measuring 1.13° and 1.83° full width at half maximum (FWHM), respectively, at the (111) peak position. Based on the Scherrer equation, with all other variables being equal, the thinner peak width in the E-NF pattern is a manifestation of a larger crystal grain size. This is consistent with images shown in FIGS. 1A-1B where E-NF has a larger grain size than H-NF because E-NF has an extended sheet structure connected to the edges of the frame.

Example 4—Experimental Composition Measurements of Nanoframes and Nanoparticles

Table 1 presents experimental composition measurements of hollow nanoframes (H-NF), excavated nanoframes (E-NF) and the corresponding nanoparticles (H-SD, E-SD).

TABLE 1

|  | ICP | XPS |
| --- | --- | --- |
| H-SD | Pt$_9$Ni$_{91}$ | Pt$_{19}$Ni$_{81}$ |
| E-SD | Pt$_{29}$Ni$_{71}$ | Pt$_{32}$Ni$_{68}$ |
| H-NF | Pt$_{67}$Ni$_{33}$ | Pt$_{80}$Ni$_{20}$ |
| E-NF | Pt$_{65}$Ni$_{35}$ | Pt$_{73}$Ni$_{27}$ |

As discussed in Example 3, XRD patterns of both the hollow and excavated nanoparticles (H-SD, E-SD) show severe asymmetry due to phase segregation such that it is difficult to assign a specific composition for each sample based on XRD. However, bulk composition information could be obtained from inductively coupled plasma optical emission spectroscopy (ICP-OES). In addition, the surface composition was obtained from X-ray photoelectron spectroscopy (XPS) measurements in FIGS. 6A-6D. According to the Beer-Lambert law, the intensity of emitted photoelectrons reaching the electron analyzer in XPS exponentially decays with the depth from which the electrons are emitted. Thus, the composition results from XPS represent surface-focused composition information. Using XPS and ICP, the location of the thin sheet structure of E-NF was confirmed by comparing composition results between H-SD and E-SD. The surface composition of H-SD, due to Pt segregation to the edges of the rhombic dodecahedron, showed increased Pt concentration compared to the bulk. In contrast, E-SD showed very similar Pt composition at the surface and in the bulk. This comparison indicated that the Pt-rich domains evident from XRD and STEM-EDS must be located equally on the exterior and interior of E-SD. These Pt-rich domains survive as outer frame and connected inner sheet structure in E-NF after chemical corrosion of Ni.

Based on the comparison of composition results from XPS and ICP, both nanoframes showed Pt-rich surface compositions compared to their bulk compositions. The Pt surface segregation was less severe for E-NF than H-NF, which is in agreement with the smaller degree of phase segregation in E-SD observed by XRD and STEM-EDS. Therefore, the extended terrace structure in E-NF has a more even distribution of Pt and Ni, allowing Ni to influence the electronic structure of the catalyst surface to a greater degree than in H-NF. It is well known that Pt—Ni alloys have weaker binding with surface adsorbates than pure Pt, leading to a downshift in the d-band center position of the catalyst surface. This trend has been shown to cause higher catalytic activity in Pt-based ORR catalysts. Since H-NF has a more Pt-rich surface than E-NF, we would expect it to bind ORR-related adsorbates too strongly, resulting in lower ORR activity for H-NF.

For the solid nanoparticle precursor to the hollow nanoframe (H-SD), the surface is higher in Pt content ($Pt_{19}Ni_{81}$) than the entire nanoparticle is ($Pt_9Ni_{91}$). For E-SD (excavated), the surface and bulk compositions are very similar, meaning the Pt and Ni are distributed relatively evenly throughout E-SD. The surface (XPS) vs bulk (ICP) composition comparisons are the quantitative proof of different Pt and Ni distributions throughout the two types of solid particles which can be etched into either hollow or excavated nanoframes.

Figures 7A, 7B, 7C:
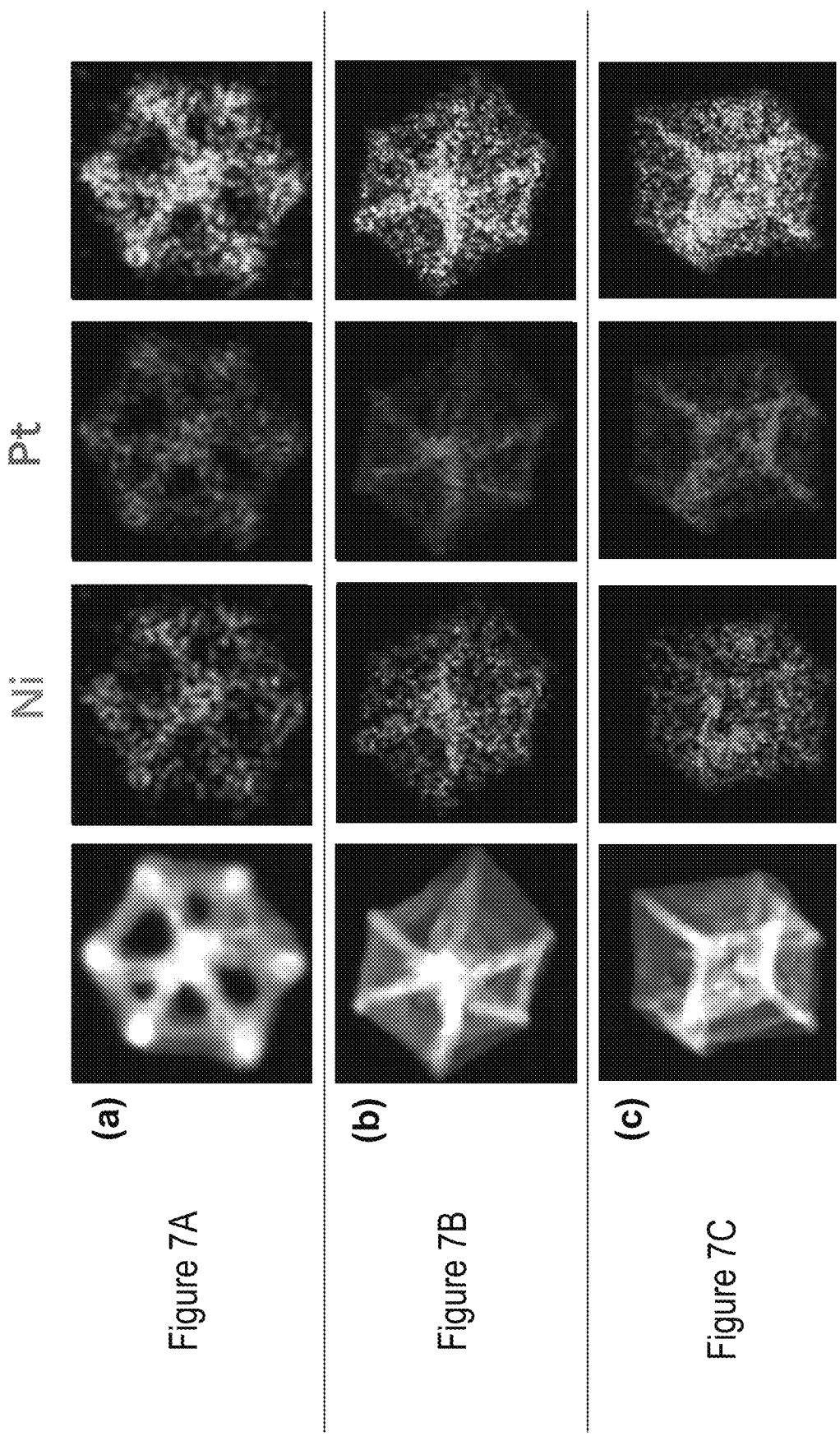
FIG. 7A shows scanning transmission electron microscopy-dark field (TEM-DF) and -energy dispersive x-ray spectroscopy (TEM-EDS) mapping of pristine Pt—Ni hollow nanoframes oriented in the 111 direction.
FIG. 7B shows scanning transmission electron microscopy-dark field and -energy dispersive x-ray spectroscopy mapping of pristine Pt—Ni excavated nanoframes oriented in the 111 direction.
FIG. 7C shows scanning transmission electron microscopy-high angle annular dark field and -energy dispersive x-ray spectroscopy mapping of pristine Pt—Ni excavated nanoframes oriented in the 110 direction.

Example 5—Scanning Transmission Electron Microscopy Dark Field Imaging of Nanoframes Scanning transmission electron microscopy dark field (STEM-DF) and elemental mapping (STEM-EDS) further demonstrate the clear lack of Pt and Ni inside hollow nanoframes (FIG. 7A), whereas excavated nanoframes (FIGS. 7B and 7C) exhibit a distinct Pt—Ni interior sheet structure inside the frame and uniform distribution of Pt and Ni within the interior sheets. FIGS. 7B and 7C show scanning transmission electron microscopy (STEM)-dark field (DF) images and STEM-energy dispersive X-ray spectroscopy (EDS) mapping of pristine H-NF and E-NF oriented in the <111> direction. The NF edges (and sheets in the case of E-NF) remain after corrosion of Ni due to their Pt-rich composition. The STEM-DF and elemental mapping also further demonstrate the clear lack of Pt and Ni inside H-NF, whereas E-NF exhibited distinct Pt—Ni sheet structure inside the frame and uniform distribution of Pt and Ni in the sheets in STEM-EDS images. For reference, FIG. 7C shows in the <110> direction that there is evident interior sheet formation extending from edge to edge in the excavated nanoframe.

Example 6—Evaluation of Catalytic Performance of Nanoframes

Figure 8B:
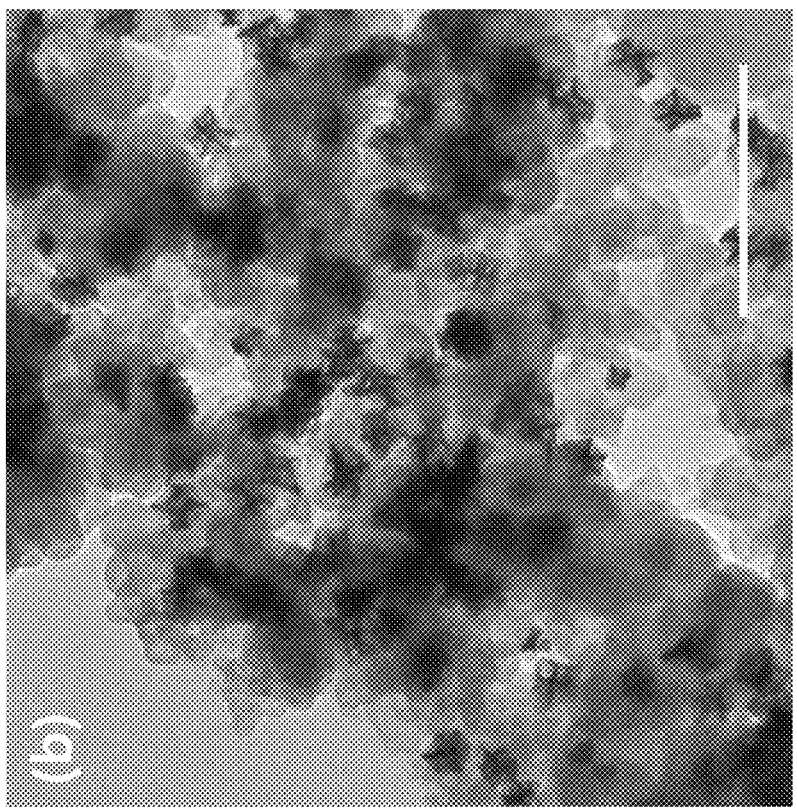
FIG. 8B is a transmission electron microscopy image of excavated nanoframes after loading onto a carbon substrate.
Figure 8A:
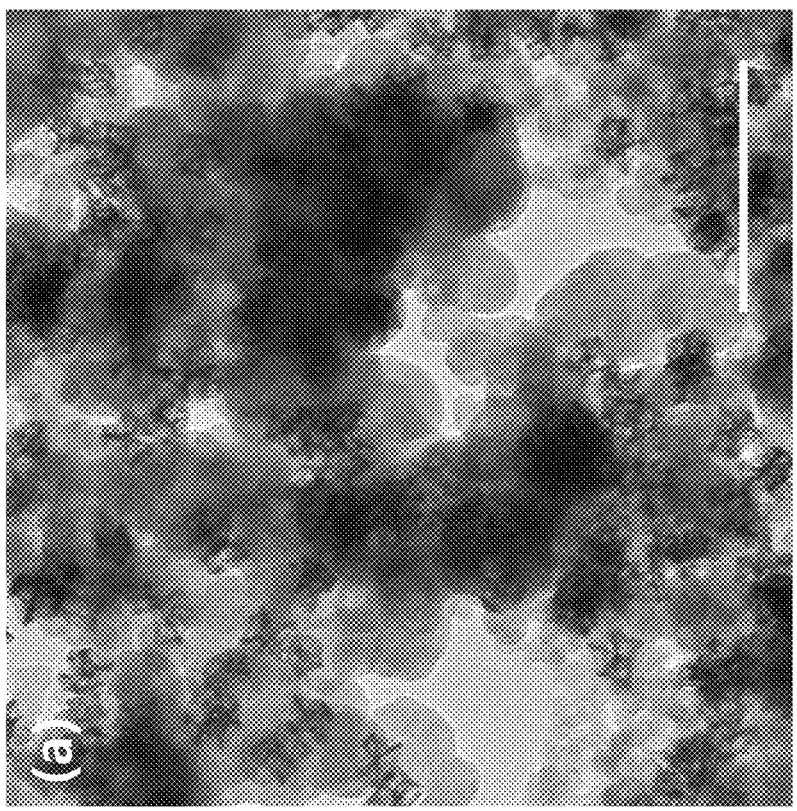
FIG. 8A is a transmission electron microscopy image of hollow nanoframes after loading onto a carbon substrate.

Highly open, three-dimensional hollow nanoframes (H-NF) and excavated nanoframes (E-NF) were loaded onto carbon supports to evaluate catalytic performance toward ORR. FIGS. 8A and 8B show a typical transmission electron microscopy (TEM) image of the H-NF and E-NF deposited on carbon. FIGS. 8A and 8B illustrate that the dispersion of H-NF or E-NF was uniform over the carbon surfaces. The final electrocatalysts are named H-NF/C and E-NF/C. The H-NF/C and E-NF/C were electrochemically tested and benchmarked against a commercial Pt/C catalyst. The Pt loading of H-NF/C and E-NF/C was set to 4.6 $\mu g/cm^2$, while that of commercial Pt/C was set to 7.8 $\mu g/cm^2$. The results are shown above in FIGS. 3A-3D.

Any ranges cited herein are inclusive. The term "about" or "approximately" used throughout is used to describe and account for small fluctuations. The term "about" or "approximately" may mean the numeric value may be modified by ±10%, ±5%, ±4%, ±3%, ±2%, ±1%, ±0.5%, ±0.4%, ±0.3%, ±0.2%, ±0.1%, or ±0.05%. All numeric values are modified by the term "about" or "approximately" whether or not explicitly indicated. Numeric values modified by the term "about" or "approximately" include the identified value; that is "about 5.0" includes 5.0. Measureable levels of atoms, elements or molecules may depend on the method of detection. In part, the term "about" or "approximately" is intended to provide for this.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

Various operations are described as multiple discrete operations, however, the order of description should not be construed to imply that these operations are necessarily order dependent. In particular, these operations need not be performed in the order of presentation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

What is claimed is:

1. An excavated nanoframe comprising:
a plurality of branches and a plurality of edges that connect to form a rhombic dodecahedral shape; and
a plurality of sheets within an interior of the excavated nanoframe, the plurality of sheets being adjacent to the plurality of branches and the plurality of edges, the plurality of branches, the plurality of edges, and the plurality of sheets comprising platinum and nickel, the plurality of branches, the plurality of edges, and the plurality of sheets comprising greater than 50 atomic % platinum.

2. The excavated nanoframe of claim 1, wherein the excavated nanoframe has an electrochemically-active surface area to volume ratio of about 0.05 nm$^{-1}$ to 1.5 nm$^{-1}$.

3. The excavated nanoframe of claim 1, wherein the excavated nanoframe has an electrochemically-active surface area to volume ratio of about 0.5 nm$^{-1}$ to 0.8 nm$^{-1}$.

4. The excavated nanoframe of claim 1, wherein the plurality of branches, the plurality of edges, and the plurality of sheets comprise a platinum-nickel alloy of the formula $Pt_{60}Ni_{40}$, $Pt_{65}Ni_{35}$, or $Pt_{70}Ni_{30}$.

5. The excavated nanoframe of claim 1, wherein platinum is at a concentration of greater than 80% by weight of the excavated nanoframe.

6. A method comprising:
providing a plurality of excavated nanoparticles; and
converting the plurality of excavated nanoparticles into a plurality of excavated nanoframes, each excavated nanoframe comprising a plurality of branches and a plurality of edges that connect to form a rhombic dodecahedral shape, and a plurality of sheets within an interior of the excavated nanoframe, the plurality of sheets being adjacent to the plurality of branches and the plurality of edges, the plurality of branches, the plurality of edges, and the plurality of sheets comprising platinum and nickel, the plurality of branches, the plurality of edges, and the plurality of sheets comprising greater than 50 atomic % platinum.

7. The method of claim 6, wherein providing the plurality of excavated nanoparticles comprises reacting a platinum precursor with a nickel precursor to form the plurality of excavated nanoparticles, wherein a mole ratio of the platinum precursor to the nickel precursor is about 0.25:1 to 10:1 or about 0.85:1 to 1:1, and wherein converting the plurality of excavated nanoparticles comprises exposing a solution comprising the plurality of excavated nanoparticles to chemical corrosion for a time duration to allow the plurality of excavated nanoparticles to undergo a reaction with a corrosive chemical.

8. The method of claim 7, wherein the time duration is about 2 hours to 8 hours or about 2 to 4 hours.

9. The method of claim 7, wherein a temperature of the solution is maintained at about 100° C. to 200° C. during the time duration.

10. The method of claim 6, wherein each excavated nanoparticle comprises platinum and nickel, and wherein a mass ratio of platinum to nickel is about 5 to 14 in each excavated nanoparticle.

11. The method of claim 6, wherein platinum is present in each of the plurality of excavated nanoparticles at a first mole percent and in each of the plurality of excavated nanoframes at a second mole percent, wherein nickel is present in each of the plurality of excavated nanoparticles at a third mole percent and in each of the plurality of excavated nanoframes at a fourth mole percent, wherein the second mole percent is greater than the first mole percent, and wherein the third mole percent is greater than the fourth mole percent.

12. The method of claim 6, wherein each excavated nanoframe comprises an electrochemically-active surface area to volume ratio of about 0.3 nm$^{-1}$ to 2.5 nm$^{-1}$.

13. The method of claim 6, wherein each excavated nanoparticle comprises a solid rhombic dodecahedral nanoparticle.

14. The method of claim 6, wherein each excavated nanoparticle comprises $Pt_{29}Ni_{71}$, and wherein each excavated nanoframe comprises $Pt_{65}Ni_{35}$.

15. The method of claim 6, further comprising:
depositing the plurality of excavated nanoframes onto an electrode; and
annealing the plurality of excavated nanoframes.

16. An electrode comprising:
a solvent-accessible surface; and
a plurality of excavated nanoframes disposed on the solvent-accessible surface, each excavated nanoframe comprising a plurality of branches and a plurality of edges that connect to form a rhombic dodecahedral shape, and a plurality of sheets within an interior of the excavated nanoframe, the plurality of sheets being adjacent to the plurality of branches and the plurality of edges, the plurality of branches, the plurality of edges, and the plurality of sheets comprising platinum and nickel, the plurality of branches, the plurality of edges, and the plurality of sheets comprising greater than 50 atomic % platinum.

17. The electrode of claim 16, wherein each excavated nanoframe has an electrochemically-active surface area to volume ratio of about 0.05 nm$^{-1}$ to 1.5 nm$^{-1}$.

18. The electrode of claim 16, wherein each excavated nanoframe has an electrochemically-active surface area to volume ratio of about 0.5 nm$^{-1}$ to 0.8 nm$^{-1}$.

19. The electrode of claim 16, wherein the plurality of branches, the plurality of edges, and the plurality of sheets of each excavated nanoframe comprise a platinum-nickel alloy of the formula $Pt_{60}Ni_{40}$, $Pt_{65}Ni_{35}$, or $Pt_{70}Ni_{30}$.

20. The electrode of claim 16, wherein platinum is at a concentration of greater than 80% by weight of each excavated nanoframe.

* * * * *